US010220228B2

(12) United States Patent
Rennie et al.

(10) Patent No.: US 10,220,228 B2
(45) Date of Patent: Mar. 5, 2019

(54) AIRCRAFT FIRE SUPPRESSION SYSTEM WITH ADDRESSABLE BOTTLE VALVE

(71) Applicant: Kidde Graviner Limited, Slough, Berkshire (GB)

(72) Inventors: Paul A. Rennie, Bracknell (GB); Josephine G. Gatsonides, Dunstable (GB); Stuart M. Smith, Colnbrook (GB)

(73) Assignee: KIDDE GRAVINER LIMITED, Berkshire (GB)

( * ) Notice: Subject to any disclaimer, the term of this patent is extended or adjusted under 35 U.S.C. 154(b) by 0 days.

(21) Appl. No.: 15/209,985

(22) Filed: Jul. 14, 2016

(65) Prior Publication Data

US 2017/0014657 A1    Jan. 19, 2017

(30) Foreign Application Priority Data

Jul. 17, 2015    (GB) .................................. 1512501.6

(51) Int. Cl.
*A62C 3/08*    (2006.01)
*A62C 37/44*    (2006.01)
(Continued)

(52) U.S. Cl.
CPC ............... *A62C 3/08* (2013.01); *A62C 35/13* (2013.01); *A62C 37/44* (2013.01); *A62C 99/0018* (2013.01); *B64D 2045/009* (2013.01)

(58) Field of Classification Search
CPC ........... A62C 3/08; A62C 37/00; A62C 37/04; A62C 37/36; A62C 37/38; A62C 37/40;
(Continued)

(56) References Cited

U.S. PATENT DOCUMENTS 4,726,426 A * 2/1988 Miller ................ A62C 99/0018
169/16
7,510,022 B2    3/2009 Lazzarini
(Continued)

FOREIGN PATENT DOCUMENTS

CN    203577214 U    5/2014
CN    104368113 A    2/2015
(Continued)

OTHER PUBLICATIONS

GB Search Report for Application No. GB1512501.6; dated Feb. 4, 2016; 4 Pages.

*Primary Examiner* — Alexander Valvis
(74) *Attorney, Agent, or Firm* — Cantor Colburn LLP

(57) ABSTRACT

A fire suppression system for a plurality of enclosures in an aircraft comprises a plurality of bottles containing fire suppression agent, a temperature sensor and a pressure sensor on each bottle for measuring temperature and pressure data of the bottle contents, an addressable bottle valve on each bottle and a control unit. The control unit is configured to analyze the temperature and pressure data for each bottle to determine adequacy of fire suppression agent content for extinguishing a fire in a particular enclosure of the aircraft. The control unit is further configured to control the bottle valves independently by using the bottle valves' addresses, in order to manage the release of fire suppression agent.

5 Claims, 2 Drawing Sheets

(51) Int. Cl.
    *A62C 35/13*     (2006.01)
    *A62C 99/00*     (2010.01)
    *B64D 45/00*     (2006.01)

(58) Field of Classification Search
    CPC ..... A62C 37/44; A62C 99/0018; B64C 19/00; B64C 19/02; B64D 2045/005; B64D 2045/009
    See application file for complete search history.

(56) References Cited

U.S. PATENT DOCUMENTS

| | | |
|---|---|---|
| 8,678,101 B2 | 3/2014 | Gatsonides et al. |
| 8,925,642 B2 | 1/2015 | Meier et al. |
| 9,033,061 B2 | 5/2015 | Chattaway et al. |
| 2010/0236796 A1 | 9/2010 | Chattaway et al. |
| 2011/0048747 A1 | 3/2011 | Gastonides et al. |
| 2011/0186312 A1 | 8/2011 | Gatsonides et al. |
| 2011/0308823 A1 | 12/2011 | Seebaluck et al. |
| 2012/0168184 A1 | 7/2012 | Enk, Sr. |

FOREIGN PATENT DOCUMENTS

| | | |
|---|---|---|
| EP | 2353658 A1 | 8/2011 |
| EP | 2813266 A2 | 12/2014 |

\* cited by examiner

AIRCRAFT FIRE SUPPRESSION SYSTEM WITH ADDRESSABLE BOTTLE VALVE

FOREIGN PRIORITY

This application claims priority to United Kingdom Patent Application No. 1512501.6 filed Jul. 17, 2015, the entire contents of which is incorporated herein by reference.

TECHNICAL FIELD

The present disclosure relates to fire suppression on board aircraft.

BACKGROUND

Fires on board aircraft can be extremely damaging, whether to the goods in a cargo hold, the passengers on the aircraft or to the structure of the aircraft itself. It is known in the art to provide aircraft with fire suppression systems, in order to quickly extinguish fires before they can cause serious harm. However, there are a number of problems which make suppressing a fire on board an aircraft quite difficult.

In conventional land-based fire suppression systems, the fire suppression agent may act to starve the fire of oxygen. If a fire has less than 10-12% of oxygen in the surrounding air, it will not restart. However, in aircraft, the various enclosures are not completely airtight and ventilation is provided by a central ventilation system, which circulates air throughout the various enclosures of the aircraft. Some of the fire suppression agent discharged would leak out of the enclosure containing the fire, thereby increasing the proportion of oxygen in the air and possibly allowing a fire to restart.

Additionally, during the descent of an aircraft, the external ambient air and cabin pressures increase, and with that, the proportion of oxygen in the aircraft increases. Thus even if the proportion of oxygen in a protected enclosure is initially reduced below a certain level, over time, the proportion will slowly increase again, thereby undoing the work of the fire suppression agent and potentially causing the fire not to be put out, or to restart. This situation presents a difficulty in controlling the environment around the fire.

The current aircraft fire suppression systems known in the art initially introduce an initial large quantity of fire suppression agent into the enclosure. In order to then avoid the above mentioned problems, these systems then continue to discharge a slow flow of the fire suppression agent, in order to make up for the losses in the aircraft and the addition of further oxygen.

Regarding the choice of fire suppression agent, many current systems make use of halon which may, for example, comprise halon 1211, which is bromochlorodifluoromethane (CF2ClBr), or halon 1301 which is bromotrifluoromethane (CBrF3), or a mixture of the two. However, in recent years, production of halon has become illegal due to environmental concerns of ozone depletion and thus there is a limited supply available for use as a fire suppression agent. Various other fire suppression agents have been tested, including inert gas fire suppression agents. These may include nitrogen, argon, helium, FM 200 or carbon dioxide. There is also the possibility of using recovered nitrogen and carbon dioxide. It has been found that a smaller quantity of halon is required to put out the same size fire than inert gas. Since a substantially greater volume of inert gas needs to carried than that of halon, a greater weight is carried for the same suppressing capability and results in more aircraft fuel being burnt to carry the fire suppression agent. Consequently, for current systems, the environmental impact of the additional greenhouse gases is comparable to the use of halon and so halon is still used in aircraft fire suppression systems, with some systems using a combination of halon and halon-replacement systems.

One of the disadvantages of current aircraft fire suppression systems is that for each new fire, a new bottle of gas is opened to generate the initial high rate release of fire suppression agent, without any consideration as to the remaining contents of the already open bottle. This is wasteful and additionally means that more bottles are carried than may be necessary, thereby resulting in a weight and fuel penalty. Thus there exists in the art a need for an improved aircraft fire suppression system.

It would be desirable to improve the efficiency of inert gas based fire suppression systems so that the weight penalty compared to carrying halon would be reduced and the environmental effects of carrying and using the inert gas could have at least similar, if not less of an environmental impact.

Some improvements in this regard are taught in EP-A-2813266 and EP-A-2353658, the entire contents of which are incorporated herein by reference.

SUMMARY OF THE DISCLOSURE

According to a first aspect of the disclosure, there is provided a fire suppression system for a plurality of enclosures in an aircraft comprising: a plurality of bottles containing fire suppression agent; a temperature sensor and a pressure sensor on each bottle for measuring temperature and pressure data of the bottle contents; an addressable bottle valve on each bottle; and a control unit configured to analyse the temperature and pressure data for each bottle to determine adequacy of fire suppression agent content for extinguishing a fire in a particular enclosure of the aircraft and further configured to control the bottle valves independently by using the bottle valves' addresses, in order to manage the release of fire suppression agent.

In some embodiments the control unit is configured with fire suppression agent discharge responses for each enclosure of the aircraft and wherein the control unit is configured to select a bottle from the plurality of bottles by making reference to the temperature and pressure data and determining the adequacy of the fire suppression agent content in each bottle for extinguishing a fire in the enclosure of the aircraft where fire or risk of fire has been detected. The fire suppression agent may comprise an inert gas or combination of inert gases, for example, a mixture of argon and nitrogen.

Discharge responses may comprise information about the size of a particular enclosure, the ventilation to a particular enclosure as well as the flammability of the contents of a particular enclosure. By having this information configured into the control unit, the system will be better able to predict correctly the amount of fire suppression agent required at each stage of a fire occurrence in order to efficiently control and extinguish a fire in a given sized enclosure which has contents having a given flammability and with a known ventilation leakage.

In some embodiments each of the bottle valves is configured to transmit temperature and pressure data for the respective bottle to the control unit together with an address for that bottle valve.

By providing and analysing the temperature and pressure of the individual bottles, there is more control over the release and less wastage of the fire suppression agent. By determining the adequacy of the content of the bottles, fires can be put out and/or controlled with less wastage from opening new bottles for each fire. More efficient use of the fire suppression agent means less fire suppression agent needs to be carried by the aircraft and thus a smaller weight penalty for the aircraft.

In some embodiments, the plurality of bottles comprises a designated master bottle and a plurality of designated slave bottles; a manifold is arranged to be pressurised with fire suppression agent from the master bottle, and optionally one or more of the slave bottles, prior to discharge to an enclosure of the aircraft where fire or risk of fire has been detected; and the control unit is configured to regulate the discharge of fire suppression agent from the manifold to produce an initial high rate of discharge followed by a period of low rate of discharge in the enclosure.

In some embodiments, in the case of fire detection in the enclosure of the aircraft, the control unit is configured to check the temperature and pressure data of the master bottle, and if the master bottle cannot provide sufficient fire suppression agent required for the initial high rate of discharge, the control unit will analyse the data from each slave bottle in turn until an appropriate slave bottle or group of bottles is identified which can provide the manifold with sufficient fire suppression agent to give the desired rate of discharge; and the control unit is configured to send a signal to the bottle valve of the identified slave bottle or bottles to release fire suppression agent to the manifold for discharge to the enclosure where fire or risk of fire has been detected.

In analysing the data from the bottles, the control unit may also take into account the quantity and rate of production of recovered nitrogen and/or carbon dioxide. In this case, less bottled fire suppression agent would be needed, since it would be supplemented by the recovered gases.

By analysing any partly used bottles initially, there may be no need to open a new bottle, for example, where the enclosure requires a smaller volume of suppression agent, thus less wastage of fire suppression agent occurs.

In some embodiments, in the case of fire detection in a further enclosure of the aircraft: the control unit is configured to regulate discharge of fire suppression agent from the manifold to produce an initial high rate of discharge followed by a period of low rate of discharge in the further enclosure, wherein the control unit is configured to determine, on the basis of the data from the bottles, which bottle valves need to be opened to release sufficient fire suppression agent into the manifold to give the desired rate of discharge in the further enclosure, e.g. taking into account the requirements of the other enclosure(s) where fire suppression agent is being released.

By determining and opening bottle valves to release fire suppression agent according to the required rate of discharge, sufficient fire suppression can occur without excess agent going to waste. As a result, the weight savings described above can be achieved, since less fire suppression agent will be needed to be carried.

In some embodiments the control unit is configured to continuously monitor data from the bottles; and to send a warning signal if the data from the bottles falls below a preset minimum threshold; and/or to determine whether to select additional bottles to produce a desired rate of discharge.

By continuously monitoring the bottles, a new bottle can be opened as required, thus not allowing the fire time to restart and keeping the fire under control.

In some embodiments the plurality of bottles are provided in the aircraft behind an internal wall or panel of the aircraft requiring disassembly of a part of the aircraft in order to access the plurality of bottles.

Thus the present disclosure provides a benefit in that difficult to access condition information can be provided to the control unit and utilised without the need to move any panels. Further, the temperature and pressure data can be known more regularly than the current manual routine safety checks.

According to a second aspect of the disclosure, there is provided a method for controlling the release of fire suppression agent in an aircraft fire suppression system, comprising: providing a plurality of bottles containing fire suppression agent, each bottle having a temperature sensor and a pressure sensor for measuring temperature and pressure data of the bottle, each bottle further being provided with an addressable bottle valve for controlling the release of fire suppression agent; providing a control unit configured to analyse the temperature and pressure data for each bottle to determine adequacy of fire suppression agent content for extinguishing a fire in a particular enclosure of the aircraft and, by using the bottle valves' addresses, control the bottle valves independently to manage the release of the fire suppression agent.

In some embodiments the method includes configuring the control unit with fire suppression agent discharge responses for each enclosure of the aircraft, and the control unit selecting a bottle from the plurality of bottles by making reference to the temperature and pressure data and determining the adequacy of the fire suppression agent content in each bottle for extinguishing a fire in the enclosure of the aircraft where the fire or risk of fire has been detected.

In some embodiments the method includes the bottle valves transmitting temperature and pressure data for the respective bottle to the control unit together with an address for that bottle valve.

In some embodiments providing of the plurality of bottles comprises providing a designated master bottle and a plurality of designated slave bottles; the method comprising pressurising a manifold with fire suppression agent from the master bottle, and optionally one or more of the slave bottles, prior to discharging the fire suppression agent to an enclosure of the aircraft where fire or risk of fire has been detected; and the control unit regulating the discharge of fire suppression agent from the manifold to produce an initial high rate of discharge followed by a period of low rate of discharge in the enclosure.

In some embodiments in the case of fire detection in the enclosure of the aircraft: the control unit checks the temperature and pressure data of the master bottle, and if the master bottle cannot provide sufficient fire suppression agent required for the initial high rate of discharge, the control unit analyses the data from each slave bottle in turn until an appropriate slave bottle or group of bottles is identified which can provide the manifold with sufficient fire suppression agent to give the desired rate of discharge; and the control unit sends a signal to the bottle valve of the identified slave bottle or bottles to release fire suppression agent to the manifold for discharge to the enclosure where fire or risk of fire has been detected.

In some embodiments in the case of fire detection in a further enclosure of the aircraft: the control unit regulates discharge of fire suppression agent from the manifold to produce an initial high rate of discharge followed by a period of low rate of discharge in the further enclosure, wherein the control unit determines, on the basis of the data from the bottles, which bottle valves need to be opened to release sufficient fire suppression agent into the manifold to give the desired rate of discharge in the further enclosure.

In some embodiments, the control unit continuously monitors data from the bottles; and sends a warning signal if the data from the bottles falls below a preset minimum threshold; and/or determines whether to select additional bottles to produce a desired rate of discharge.

BRIEF DESCRIPTION OF THE DRAWINGS

Various embodiments of the disclosure will now be described with reference to the following description and drawings by way of example only, and with reference to certain figures, wherein.

DETAILED DESCRIPTION

Figure 1:
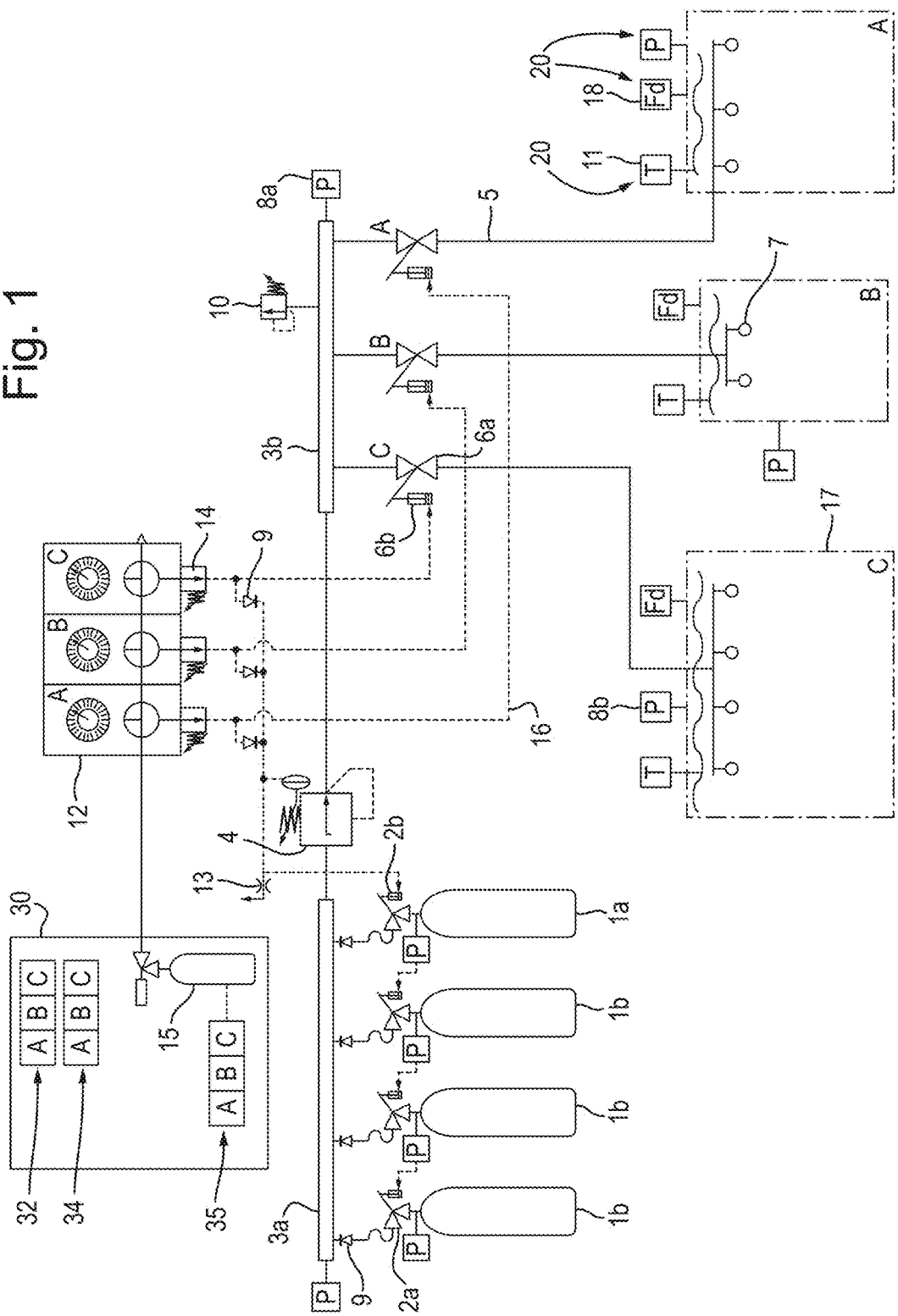
FIG. 1 shows a schematic diagram of an aircraft having a fire suppression control system for a plurality of enclosures.

An aircraft with a fire suppression system comprises multiple enclosures 17, A, B, C. These enclosures may include, but are not limited to, cargo bays, passenger enclosures, fuel tanks an auxiliary power unit and an electronics bay. The enclosures may also be referred to as zones, compartments or areas.

The system further comprises a plurality of high pressure bottles 1a, 1b, which are configured to contain fire suppression agent. Each of the bottles 1a, 1b comprises a bottle valve 2a, as well as a bottle valve actuator 2b which is operatively connected to a control unit 12. The bottle valves 2a each comprise a pressure and temperature sensor, and may transmit temperature and pressure data measured from the contents of the bottle by the sensors to the control unit 12. The bottle valves 2a comprise a pre-stored address, e.g. in the form of a code, which is transmitted with the temperature and pressure data to the control unit 12. It may, for example, comprise a numeric, alphabetic or alphanumeric code to identify the given bottle within the plurality of bottles.

The bottles 1a, 1b may be referred to as high pressure vessels, vessels, containers or cylinders and may be arranged in groups and/or in a bank or banks.

The control unit 12 comprises a processor and a memory, for monitoring and storing the data from the sensors. The memory further comprises pre-set data for comparison against the data received from the sensors, in order to recognise if there is adequate fire suppression agent for extinguishing and/or controlling a fire in a particular enclosure or enclosures (the "protected enclosures").

The bottles 1a, 1b are connected by a check valve 9 to a high pressure collector manifold 3a. The manifold 3a in turn is connected to a discharge pressure regulator 4, which may be in the form of a control valve. The discharge regulator 4 is further connected to a low pressure distributor manifold 3b and thence, through a discharge network 5 to the enclosures.

When the fire suppression system is activated for a particular first enclosure, the control unit 12 checks the condition of the contents of a master bottle 1a, by reading the data from the addressable bottle valve 2a on the master bottle 1a. This is compared with pre-set values stored in the memory of the control unit 12, in order to determine if there is sufficient fire suppression agent for control of and/or to extinguish the fire, e.g. in accordance with at least a pre-stored high rate discharge response. It may also determine a different bottle or group of bottles for maintenance of a subsequent prestored low rate discharge response for the remaining duration of the flight.

Figure 2:
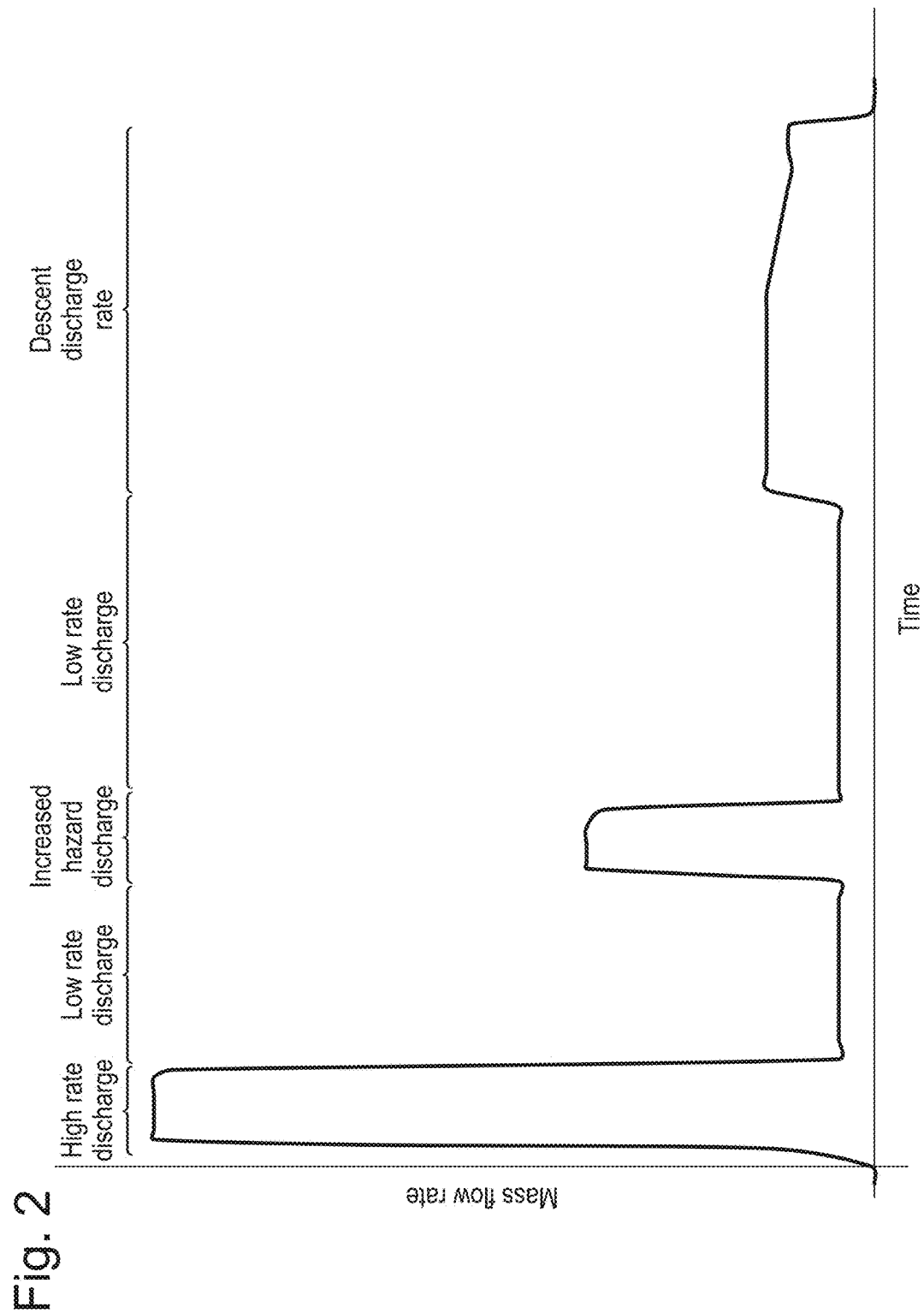
FIG. 2 shows a graph of an exemplary mass flow rate of fire suppression agent over time in order to suppress a fire, from the moment of initial activation, during cruising at altitude and descent till arrival at ground level of the aircraft.

As can be seen in FIG. 2, the mass flow rate of the initial high rate discharge can be more than 10 times that of the minimum low rate discharge. The increased hazard discharge rate may be three, four, five or more times greater than the minimum low rate discharge and the descent discharge rate may be two, three, four or more times greater than the minimum low rate discharge.

If there is sufficient fire suppression agent in the bottle 1a, then the control unit 12 will send a signal to the valve actuator 2b to open the bottle 1a, thereby releasing fire suppression agent, or if the master bottle 1a is already open, the control unit 12 will not proceed to analyse the data of further bottles (slave bottles) 1b.

If there is insufficient fire suppression agent in vessel 1a, either due to leakage from the master bottle 1a, or due to a previous use during the flight and there being very little left in the bottle 1a, the control unit 12 will read the data from the addressable bottle valve 2a of the next bottle in the plurality of bottles, i.e. a slave bottle 1b, and compare the data with pre-set data in the memory of the control unit 12. This process is repetitive for each of the bottles, until the control unit 12 finds a bottle with sufficient fire suppression agent to meet the requirements of the fire incident. In that case, the control unit 12 will send a signal to the valve actuator 2b of the relevant bottle 1a, 1b to open the bottle 1a, 1b and the fire suppression agent will be released to the manifold 3a.

Before and throughout the discharge, the valve sensors continue to transmit data to the control unit 12, which continues to monitor and compare the data with pre-set values stored on the memory. In accordance with the data transmitted by the sensors, the control unit 12 can be prepared to open a new bottle 1b if required, or to use the remnant of already opened bottles 1a, 1b if only a small amount of fire suppression agent is required. This ensures efficient use of the limited supply which can be carried on board.

In the event that there is a subsequent further fire, the control unit 12 will analyse the status of the contents of each of the bottles 1a, 1b and decide accordingly whether a new bottle 1b need be opened at all.

By being efficient with fire suppression agent, the large quantities of inert gas which might need to be carried can be reduced. This results in weight savings for the aircraft and thus, weight, space and fuel savings are made compared to earlier systems.

Moreover, fire suppression agent management on an aircraft is extremely important, since if the aircraft runs out of fire suppression agent part-way through the flights, then the fire may restart with no means of prevention remaining. Thus by rationing the fire suppression agent in this economic way, a greater safety of the aircraft is ensured.

A further benefit is given because the system monitors the quantity and efficacy of the remaining fire suppression agent, which is currently usually done during manual servicing. Thus if the bottles 1a, 1b leak, a warning signal due to low remaining supply of fire suppression agent could be sent, in order to alert the relevant personnel to the need for a restock of fire suppression agent for the flight. This could therefore ensure that there would be no flights unintentionally taking off without any form of, or at least with insufficient quantities of fire suppression agent available on board. Further, a warning signal could be activated when the level of fire suppression agent in a bottle, and/or total amount of agent in all of the bottles reduces below a preset threshold level. This would result in knowledge that restocking is required and thus allow plenty of time for such an operation to take place without disrupting flight scheduling.

In some embodiments, the control unit 12 may be electric; in others, it may be electronic, hydraulic, pneumatic or mechanical.

In the case of a pneumatic system, a pressure bottle 16 may cause the valve actuators 2b for the relevant bottle 1a, 1b to be actuated, thereby opening the relevant bottle valves 2a. The pneumatic system may further comprise a vent exhaust 13 for venting the pneumatic fluid from the system in the case of over-pressurisation.

The present disclosure can be further modified, as will be understood by one skilled in the art, within the scope of the present invention as defined in the claims.

The invention claimed is:

1. A fire suppression system for a plurality of enclosures in an aircraft comprising:
   a plurality of bottles containing fire suppression agent;
   a temperature sensor and a pressure sensor on each bottle for measuring temperature and pressure data of the bottle contents;
   an addressable bottle valve on each bottle; and
   a control unit configured to analyse the temperature and pressure data for each bottle to determine adequacy of fire suppression agent content for extinguishing a fire in a particular enclosure of the aircraft and further configured to control the bottle valves independently by using bottle valves' addresses, in order to manage the release of fire suppression agent;
   wherein the plurality of bottles comprises a designated master bottle and a plurality of designated slave bottles, a manifold is arranged to be pressurised with fire suppression agent from the master bottle, and/or one or more of the slave bottles, prior to discharge to an enclosure of the aircraft where fire or risk of fire has been detected; and
   wherein in a case of fire detection in a first enclosure of the aircraft, the control unit is configured to regulate a discharge of fire suppression agent from the manifold to produce an initial high rate of discharge followed by a period of low rate of discharge in that enclosure, check the temperature and pressure data of the master bottle, and if the master bottle cannot provide sufficient fire suppression agent required for the initial high rate of discharge, the control unit will analyse the data from each slave bottle in turn until an appropriate slave bottle or group of bottles is identified which can provide the manifold with sufficient fire suppression agent to give the desired rate of discharge, and send a signal to the bottle valve of the identified slave bottle or bottles to release fire suppression agent to the manifold for discharge to the first enclosure where fire or risk of fire has been detected,
   wherein in the case of additional fire detection in a further enclosure of the aircraft, the control unit is configured to regulate discharge of fire suppression agent from the manifold to produce an initial high rate of discharge followed by a period of low rate of discharge in the further enclosure, wherein the control unit is configured to determine, on the basis of temperature and pressure data from the temperature sensor and the pressure sensor at each bottle, the adequacy of fire suppression content for extinguishing fire in a particular enclosure and which bottle valves need to be opened to release sufficient fire suppression agent into the manifold to give the desired rate of discharge in the further enclosure, taking into account the requirements of the first enclosure where first suppressant agent is being released.

2. A fire suppression system as claimed in claim 1, wherein the control unit is configured with fire suppression agent discharge responses for each enclosure of the aircraft and wherein the control unit is configured to select a bottle from the plurality of bottles by making reference to the temperature and pressure data and determining the adequacy of the fire suppression agent content in each bottle for extinguishing a fire in the enclosure of the aircraft where fire or risk of fire has been detected.

3. A fire suppression system as claimed in claim 1, wherein each of the bottle valves is configured to transmit the temperature and pressure data for the respective bottle to the control unit together with an address for the respective bottle valve.

4. A fire suppression system of claim 1, wherein the control unit is configured to continuously monitor data from the bottles; and
   to send a warning signal if the data from the bottles falls below a preset minimum threshold; and/or
   to determine whether to select additional bottles to produce the desired rate of discharge.

5. A fire suppression system of claim 1, wherein the plurality of bottles are provided in the aircraft behind an internal wall or panel of the aircraft requiring disassembly of a part of the aircraft in order to access the plurality of bottles.

* * * * *